US012801312B2

(12) United States Patent
Srinivasa Murthy et al.

(10) Patent No.: US 12,801,312 B2
(45) Date of Patent: Nov. 17, 2026

(54) ENHANCED MANAGEMENT OF NAMESPACE MOVES IN DATA STORAGE ENVIRONMENTS

(71) Applicant: NetApp, Inc., San Jose, CA (US)

(72) Inventors: Vivek Srinivasa Murthy, Bangalore (IN); Pramod John Mathew, Chennai (IN); Prashanth Adurthi, Bangalore (IN)

(73) Assignee: NetApp, Inc., San Jose, CA (US)

( * ) Notice: Subject to any disclaimer, the term of this patent is extended or adjusted under 35 U.S.C. 154(b) by 8 days.

(21) Appl. No.: 18/921,286

(22) Filed: Oct. 21, 2024

(65) Prior Publication Data

US 2026/0111146 A1 Apr. 23, 2026

(51) Int. Cl.
*G06F 3/06* (2006.01)

(52) U.S. Cl.
CPC .......... *G06F 3/0659* (2013.01); *G06F 3/0604* (2013.01); *G06F 3/0683* (2013.01)

(58) Field of Classification Search
CPC ..... G06F 3/0659; G06F 3/0604; G06F 3/0683
See application file for complete search history.

(56) References Cited

U.S. PATENT DOCUMENTS 11,134,119 B1 * 9/2021 Kulkarni ............. H04L 67/1097
2022/0129181 A1 * 4/2022 Morabad ............... G06F 3/0604
2025/0130721 A1 * 4/2025 Egan .................. G06F 11/2023

* cited by examiner

*Primary Examiner* — Eric Cardwell

(57) ABSTRACT

The disclosure describes a system for managing a namespace move between nodes of a data storage environment. During a namespace move associated with a data storage system, the system receives requests at a first node (e.g., a source node) in the data storage system to perform input/output (I/O) operations associated with a namespace subject to the namespace move and stores the requests in a queue at the first node until completion of the namespace move. Upon completion of the namespace move, the system forwards the requests from the first node to a second node (e.g., a destination node) in the data storage system and performs the I/O operations at the second node.

20 Claims, 8 Drawing Sheets

ENHANCED MANAGEMENT OF NAMESPACE MOVES IN DATA STORAGE ENVIRONMENTS

TECHNICAL FIELD

Embodiments of the present disclosure relate generally to data storage systems and in particular, to namespace moves in data storage clusters.

BACKGROUND

A namespace in a data storage context is a scope assigned to specific resources in a storage cluster via which access to the resources is governed or otherwise managed. A storage cluster typically includes multiple nodes, each comprised of a controller or controller pair and numerous storage resources (e.g., solid state drives, hard disk drives, and the like). A namespace move is when the scope of a namespace is reassigned from one group of resources to another. For example, a namespace may be moved from one node to another to allow for upgrades, maintenance, or the like.

A nonvolatile memory express (NVMe) namespace move from one node to another refers to transferring the logical storage partition (namespace) associated with NVMe solid state drives (SSDs) from one node to a different node. Locking mechanisms prevent data corruption during the transition but also cause input/output (I/O) requests to be dropped. The host can continue to retry the requests and eventually is redirected to the new node, but such churn reduces overall performance and is generally undesirable.

SUMMARY

The technology described herein improves namespace moves by enqueueing input/output (I/O) requests at source nodes associated with the namespace moves until completion of the moves, at which time they may be forwarded to new nodes to be processed. In a specific implementation, a system for managing a namespace move between nodes of a data storage environment is provided. During a namespace move associated with a data storage system, the system receives requests at a first node in the data storage system to perform input/output (I/O) operations associated with a namespace subject to the namespace move and stores the requests in a queue at the first node until completion of the namespace move. Upon completion of the namespace move, the system forwards the requests from the first node (e.g., a source node) to a second node (e.g., a destination node) in the data storage system and performs the I/O operations at the second node.

These and other features and aspects of various examples may be understood in view of the following detailed discussion and accompanying drawings.

BRIEF DESCRIPTION OF THE DRAWINGS

For a more complete understanding of the present invention(s), and the advantages thereof, reference is now made to the following descriptions taken in conjunction with the accompanying drawings.

Corresponding numerals and symbols in different figures generally refer to corresponding parts unless otherwise indicated. The figures are drawn to clearly illustrate the relevant aspects of the preferred embodiments and are not necessarily drawn to scale.

DETAILED DESCRIPTION

Disclosed herein are systems, devices, and methods for enhancing namespace moves. In various implementations, a non-disruptive protocol for moving a namespace from its owning node to any node in a cluster is disclosed. The source node queues I/O requests during the move that would otherwise be dropped and cause a disruptive error to be returned to the host. Once the namespace move is complete, the source node sends the queued I/O requests to the destination node to be processed, and the responses are returned from the destination node to the host. From the host's perspective, other than a slight delay in responses, no disruption to I/O commands are noticed.

In an implementation specific to NVMe, the NVMe protocol is modified such that the host will not receive any errors generated during the brief period where the host cannot receive responses to I/O requests. The NVMe command handling is enhanced such that the host does not receive any errors during the time the namespace is being moved from source to destination. To achieve this, I/O requests directed to a namespace in the process of being moved are queued at the first node (e.g., source node) until the move is complete. Once the move is complete, the first node forwards the queued I/O requests to the subsequent node (e.g., destination node) where they can be processed, and the results can be returned to the source node through which the host receives the response. Alternatively, the new node can reply directly to the host.

While a small delay to the I/O requests are seen during the time the namespace is moved to the destination node, none of the I/O requests fail causing any disruption to the host. As a result, not only can the host continue submitting I/O requests without disruption, but each request received during the namespace move will be processed and responded to as opposed to being dropped and generating an error.

Figure 1A:
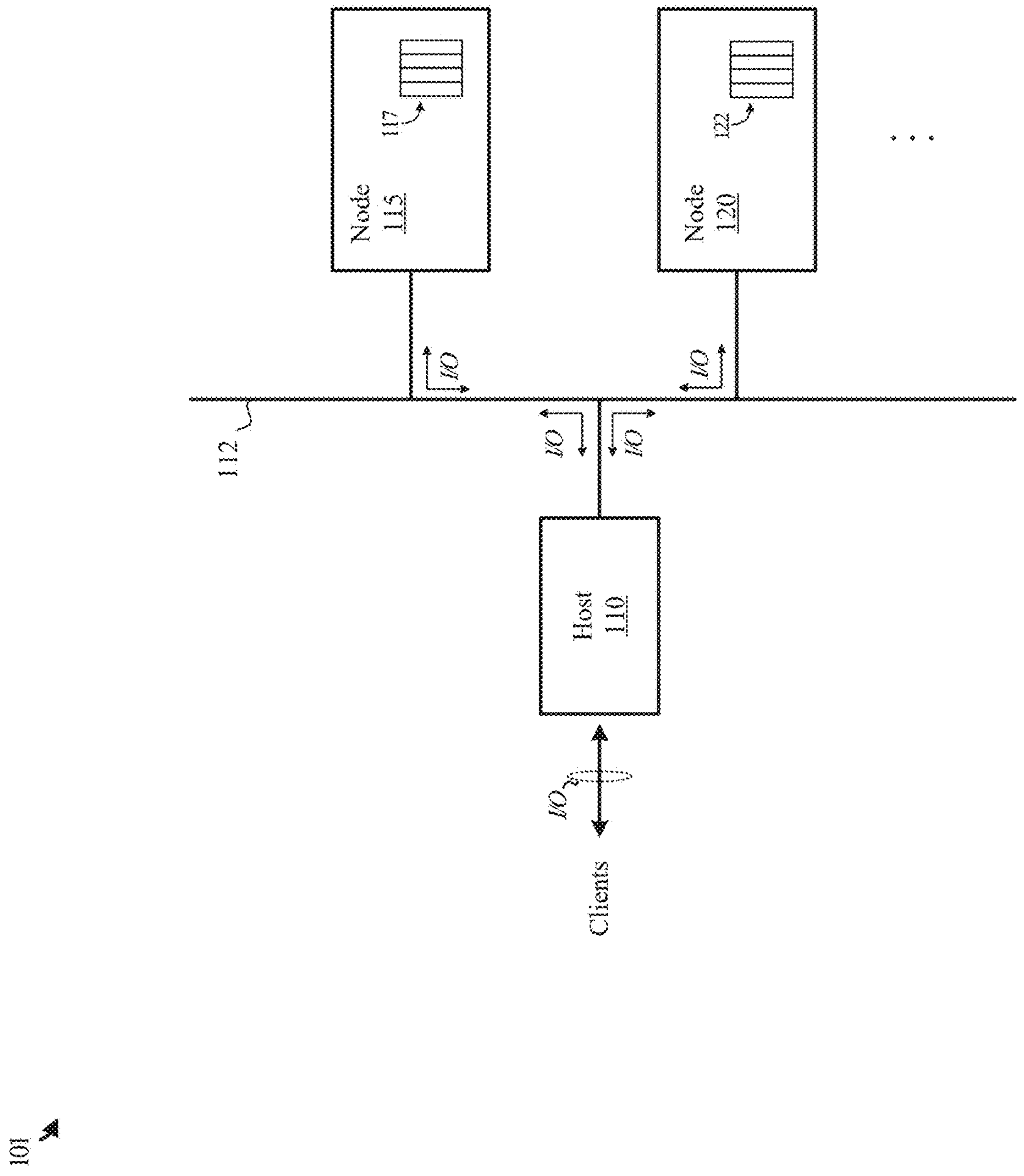
FIGS. 1A and 1B illustrate operating environments in an implementation.
Figure 1B:
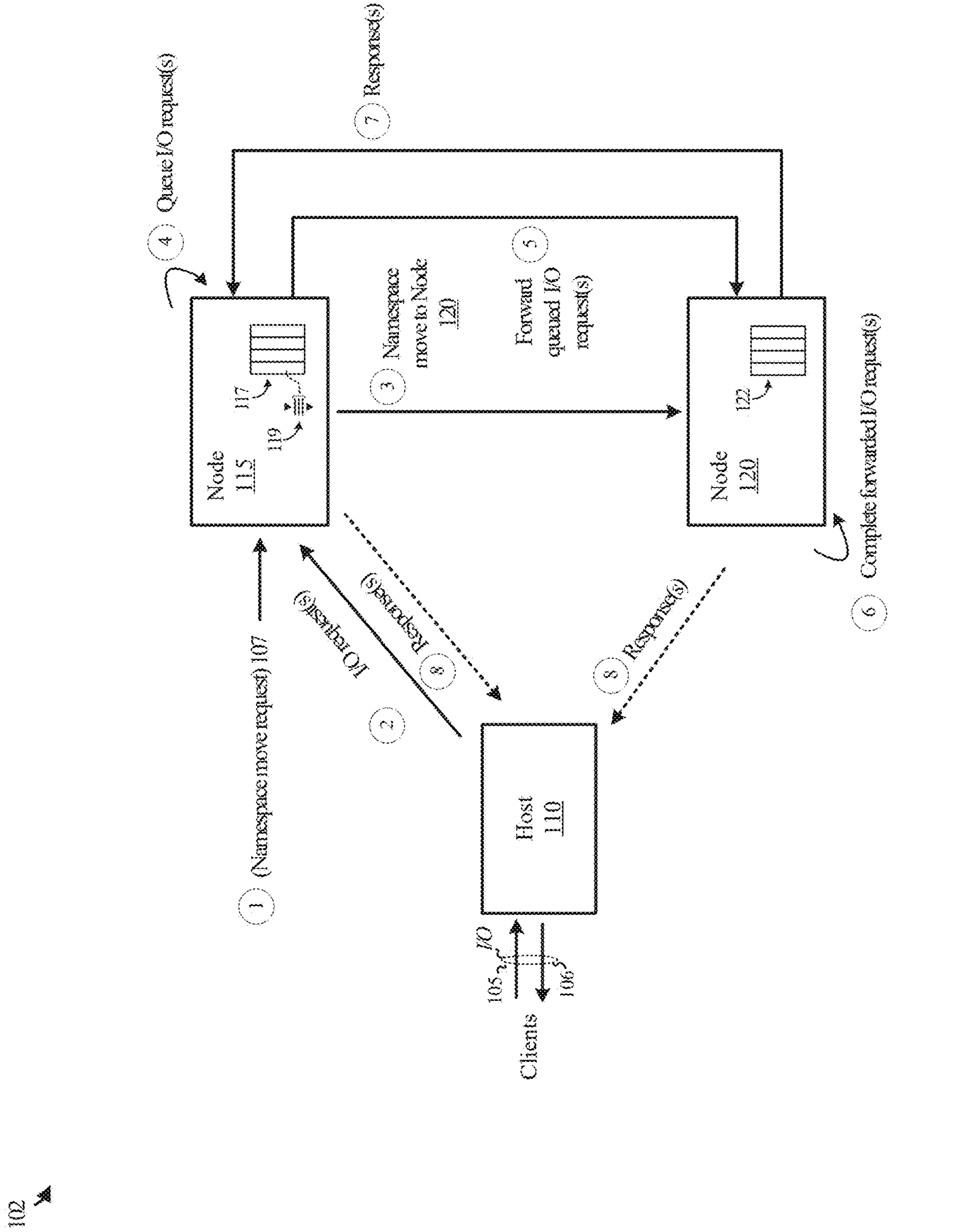

FIGS. 1A and 1B illustrate operating environments 101 and 102 for managing namespace moves in an implementation. Operating environments 101 and 102 both include host 110, node 115, and node 120. In various embodiments, nodes 115 and 120 may be configured to operate namespace move processes, such as process 200 of FIG. 2.

Host 110 may be representative of a host server, application, device, system, or the like, capable of requesting access to node 115 and node 120, and storage thereof, based on requests 105 received by host 110 and outputting responses 106 based on requests 105. Host 110 may include and may be implemented in hardware, software, and/or firmware, as well as combinations and variations thereof.

By way of example, host 110 may be representative of a server running an application that may interface with a data storage system, such as via network 112 as in operating environment 101 of FIG. 1A, to read from and write to the data storage system. Clients may access host 110, or the application thereof, via a user device (e.g., a computer, a tablet, a smartphone), and provide requests to host 110. In such an example, host 110 may be running a data storage administration and management application (e.g., storage management application 440 of FIG. 4) representative of data management software (e.g., NetApp ONTAP) capable of providing data management operations such as storage configuration, data protection, network setup and management, and risk and node and cluster performance monitoring, among other functions. Host 110 may access and provide requests to the data storage system, including various nodes such as nodes 115 and 120, via the application using an interface, such as a command line interface (CLI) over an application programming interface (API) (e.g., a RESTful API).

Requests 105 may include input/output (I/O) operations including read operations (e.g., a request to open a file) and/or write operations (e.g., a request to save data, a request to copy data or a file) corresponding to data stored at one or more of node 115 and/or node 120. In various examples, the I/O operations may specify start and end logical block addresses (LBAs) where data resides within a namespace. The namespaces may include data and program instructions, among other information, that can be accessed by host 110 at physical addresses of storage devices 117 and 122 of nodes 115 and 120, respectively.

Node 115 and node 120 may be representative of sets of storage devices and controllers associated therewith. Examples of the storage devices may include flash disks and/or capacity drives, such as hard-disk drives (HDDs) and solid state drives (SSDs), as well as combinations and variations thereof. Node 115 may include a first set of storage devices and one or more controllers capable of controlling, managing, and accessing the first set of storage devices, and node 120 may include a second set of storage devices and one or more other controllers capable of controlling, managing, and accessing the second set of storage devices. More specifically, the sets of storage devices of nodes 115 and 120 may be capable of storing data, which may be organized as referenced as namespaces. The respective controllers of nodes 115 and 120 may be capable of managing the data of respective sets of storage devices. For example, the controllers of nodes 115 may be capable of managing the namespaces, data thereof, and logical and physical addresses, as well as mappings thereof, of a respective set of storage devices. Similarly, the controllers of nodes 120 may be capable of doing the same with a respective set of storage devices. In some examples, the controllers of nodes 115 and 120 may be capable of managing any storage devices in the data storage system.

The controllers of nodes 115 and 120 may each include one or more processing devices configured to execute program instructions to enable functionality provided by the program instructions. Examples of the processing devices may include one or more central processing units (CPUs), general purpose processors, Application Specific Integrated Circuits (ASICs), microcontroller units (MCUs), digital signal processors (DSPs), field-programmable gate arrays (FPGAs), and the like. In some examples, nodes 115 and 120 may each include two or more controllers coupled as high availability (HA) pairs for at least fault tolerance and back-up purposes.

Nodes 115 and 120, or controllers thereof, may each be running an instance of the data storage management application (e.g., data storage management application 440) to perform the I/O operations provided to nodes 115 and 120 by host 110 via network 112 as illustrated in FIG. 1A. As such, nodes 115 and 120 may interface with host 110 via the application in accordance with a storage network and access protocol, such as Non-Volatile Memory Express over Fabrics (NVMe-oF). Other protocols such as Network File System (NFS), Server Message Block protocol (SMB), Internet Small Computer System Interface (iSCSI), Fiber Channel (FC), Fiber Channel over Ethernet (FCoE), and the like may be contemplated.

Referring now specifically to operating environment 101 of FIG. 1A, host 110, node 115, and node 120 may be coupled and may communicate together across network 112. Network 112 may be representative of a virtual network (e.g., VLAN) or a local area network (LAN). Various other hosts, nodes, and devices may also be coupled to and communicate via network 112.

In some examples, such as in operating environment 102 of FIG. 1B, host 110 may communicate with nodes 115 and 120 irrespective of network 112. In operating environment 101, node 115 is shown to include storage devices 117, and node 120 is shown to include storage devices 122. Storage devices 117 and 122 may include any number of storage devices of several types.

The following operations refer to elements of operating environment 102 but may be applicable to elements of operating environment 101 as well.

In operation, node 115 receives a namespace move request 107. In some embodiments, the namespace move request 107 may be provided by host 110. In some embodiments the namespace move request 107 may be provided by a storage management application. The namespace move request 107 may indicate one or more namespaces of node 115 subject to a namespace move, or in other words, to be moved and/or copied to node 120. A namespace may be moved from one node (a source node) to another node (a destination node), or to multiple other nodes, for various reasons, such as based on updates or upgrades to storage devices of a given node, updates or upgrades to controllers of a given node, storage efficiency or capacity requirements, or access efficiency to host 110, among other reasons.

During the namespace move, host 110 receives requests 105 from one or more clients. Requests 105 may correspond to a namespace residing on one or more storage devices of node 115. Host 110 provides one or more I/O requests, based on requests 105, indicating the namespace to node 115 (e.g., a source node). The I/O requests may be indicative of requests to perform I/O operations (e.g., read operations, write operations) associated with a namespace subject to the namespace move as in namespace move request 107. In some embodiments, the namespace indicated in the I/O request may be the same namespace being moved to node 120 (e.g., a destination node). In some such embodiments, node 115 may identify that the namespace being requested by host 110 is subject to and undergoing a move to node 120, and thus, may move the namespace to node 120 and queue the given I/O request at queue 119 of node 115. Node 115 may add any requests corresponding to the moving namespace to queue 119 of node 115 for completion by node 120 until and upon completion of the namespace move from node 115 to node 120. In some embodiments, the queue 119 may be stored in a storage device of the set of storage devices of node 115. In some embodiments, the queue 119 may also be stored and maintained in a storage device of the set of storage devices of node 120.

Based on completion of the namespace move from node 115 to node 120, node 115 may provide any I/O requests received during the duration of the namespace move that correspond to the namespace being moved to node 120. Node 120 may complete the forwarded I/O requests. In some embodiments, based on completing the requests, node 120 may provide responses back to node 115, and node 115 may provide responses to host 110. In some embodiments, node 120 may provide responses directly to host 110. Based on receiving response(s) from node 115 or node 120, host 110 can output responses 106, which may include an indication or an acknowledgement of completion of requests 105, information (e.g., data) based on requests 105, and the like.

Furthermore, prior to, subsequent to, or during the namespace move, host 110 may receive additional requests to perform I/O operations associated with a namespace not subject to the namespace move as indicated in namespace move request 107. Host 110 may provide the I/O operations to node 115, and node 115 may perform the I/O operations and provide corresponding responses to host 110 based on completion of the I/O operations as the namespace associated with the I/O operations is available and not moving to node 120 at the given time.

While the above describes an example of a namespace move from node 115 to node 120, various namespaces may be transferred between nodes of a system or environment at varying times and over varying durations. Both nodes 115 and 120 may utilize one or more queues to delay performance of I/O requests corresponding to namespaces being moved to avoid providing error indications to host 110 and causing inefficiency or latency in processing of I/O requests by host 110. Advantageously, during namespace moves, nodes 115 and 120 can perform actions of I/O requests without introducing errors at host 110, or in other words, in a non-disruptive manner, as any I/O requests may be subsequently performed by a node on which the given namespace resides.

Figure 2:
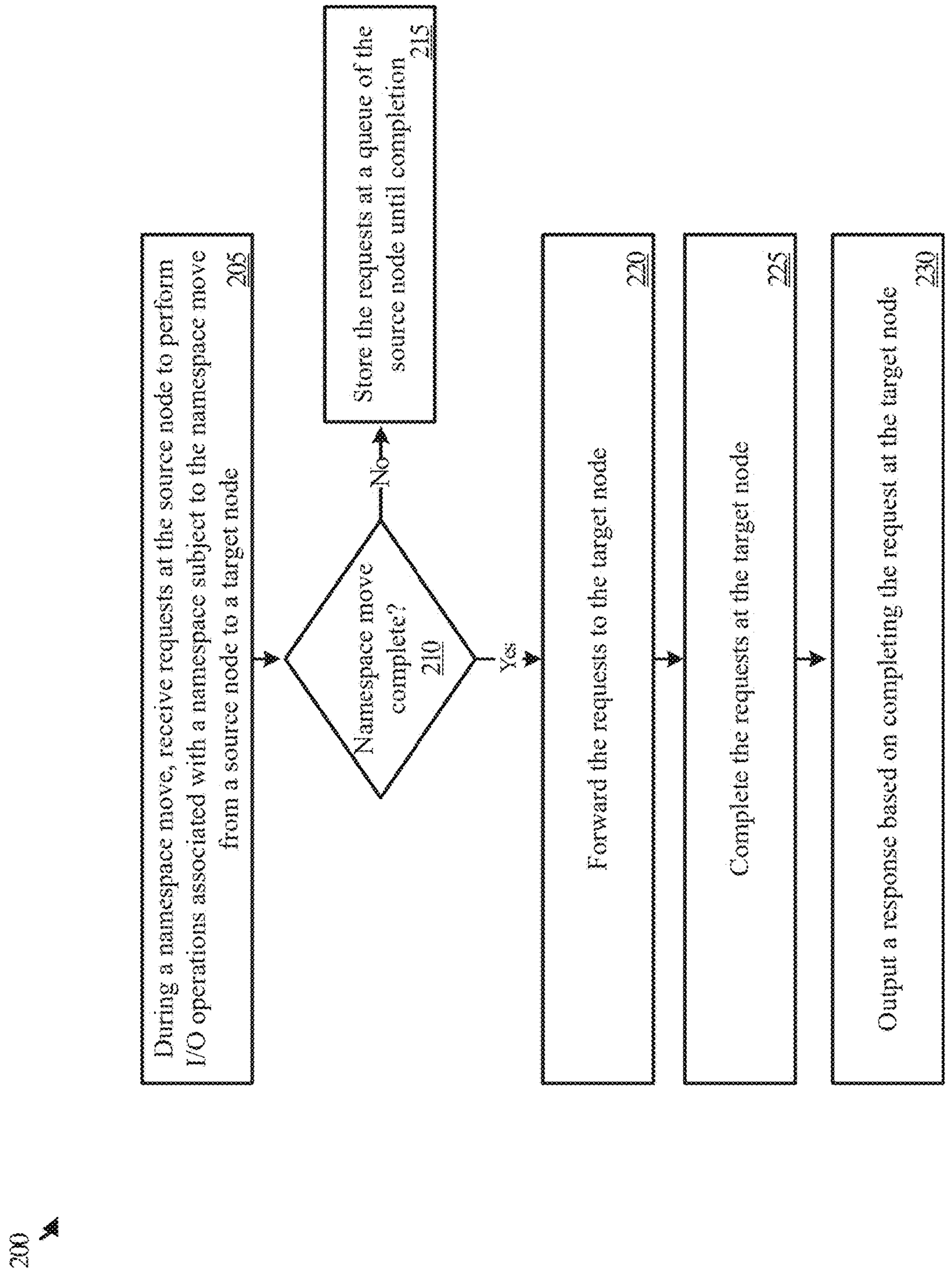
FIG. 2 illustrates a method for managing a namespace move between nodes of a data storage system in an implementation.

FIG. 2 illustrates a method for managing a namespace move between nodes of a data storage system in an implementation represented by process 200. Process 200 may be employed by a computing device, such as a controller of node 115 or a controller of node 120, an example of which is provided by computing system 701 of FIG. 7. Accordingly, process 200 may be implemented in hardware, software, and/or firmware, and may be implemented in program instructions executable by one or more processors of the computing device. The program instructions direct the computing device to operate in accordance with the steps of process 200, which reference elements of FIGS. 1A and 1B.

In step 205 of process 200, node 115 receives namespace move request 107 including an indication to move a namespace from a source node (node 115) to a target node (node 120). The namespace move request 107 may be provided to node 115 by host 110, or by another computing system, and may direct node 115 to move the namespace to node 120. The duration of the namespace move may vary based on several factors, such as the size of the namespace (e.g., the number of logical block addresses associated with the namespace), the processing capacity of node 115, the processing capacity of node 120, and the like.

During the namespace move, in step 205, host 110 may receive requests 105 that correspond to the namespace and may provide I/O requests to node 115 based on requests 105. The I/O requests may be representative of requests to perform I/O operations associated with a namespace subject to the namespace move from node 115 to node 120. For example, an I/O request may include a write operation associated with the namespace subject to the namespace move and/or the I/O request may include a read operation associated with the namespace subject to the namespace move.

Node 115 may identify that the namespace in the I/O request corresponds to the namespace specified in the namespace move (i.e., the namespace is subject to the move from node 115 to node 120). In step 210, node 115 may determine whether the move of the namespace is complete. If the namespace move has not finished, in step 215, node 115 may store the I/O request at queue 119 of node 115 until completion of the namespace move for completion of the request by node 120 upon completion of the namespace move. If the namespace move has finished, and the namespace resides on node 120, in step 220, node 115 forwards the I/O request(s) from queue 119, as well as any other requests received during the namespace move that correspond to the moving namespace, to node 120 for completion.

In step 225, node 120 completes the I/O request. For example, the I/O request may include a read operation specifying data to be read that is stored at one or more addresses of the namespace, or the request may include a write operation specifying data to be written to one or more addresses of the namespace. As such, in step 230, node 120 outputs a response based on the request. In some embodiments, based on completing the request, node 120 may reply and provide a response back to node 115, and node 115 may reply and provide the response to host 110. In some embodiments, node 120 may provide the response directly to host 110. Based on receiving the response from node 115 or node 120, host 110 can output responses 106, which may include an indication or an acknowledgement of completion of requests 105, information (e.g., data) based on requests 105, and the like based on requests 105.

Figure 3:
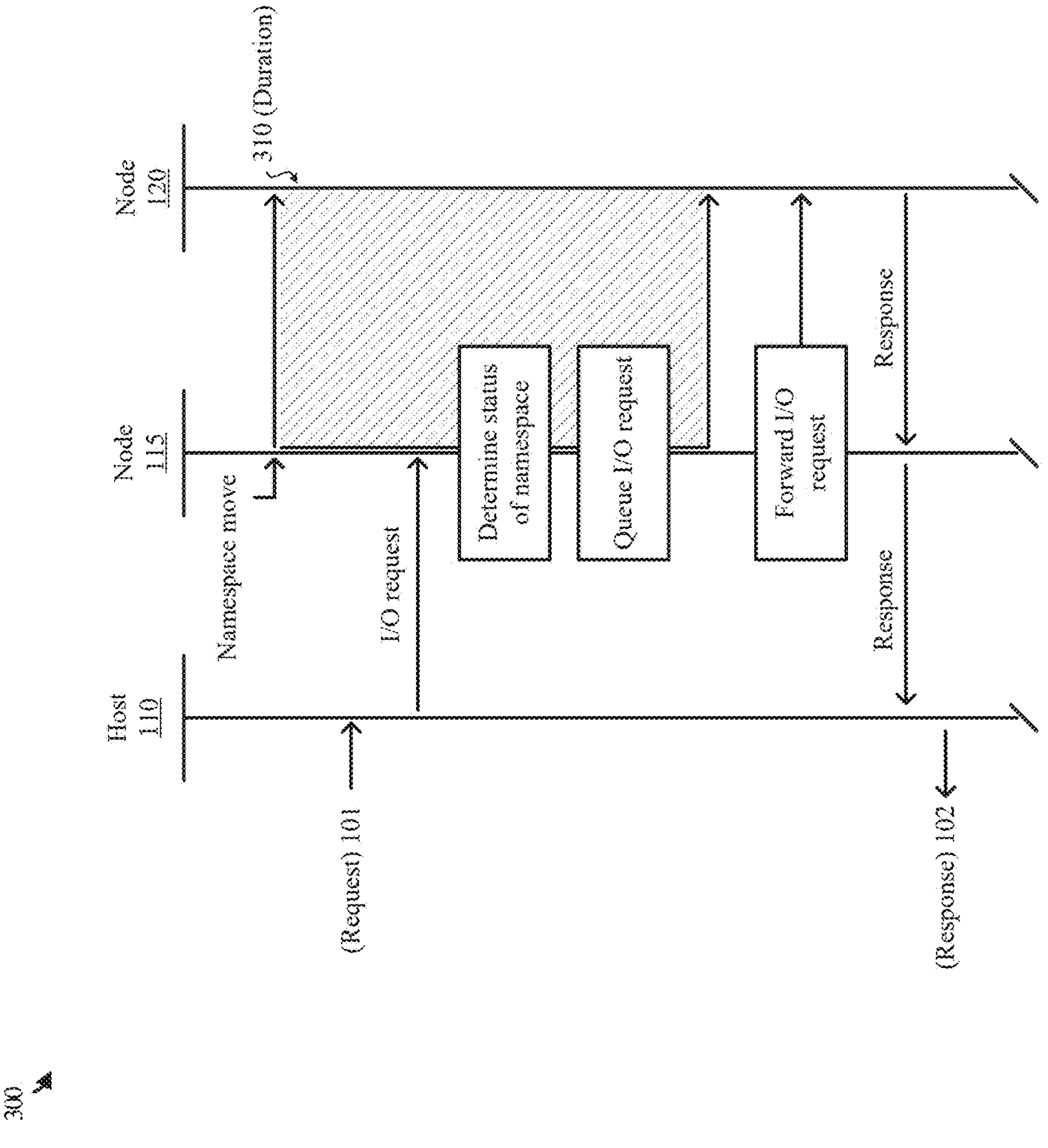
FIG. 3 illustrates an operational sequence related to a namespace move in an implementation.

FIG. 3 illustrates an operational scenario of an application of process 200 in the context of operational environment 100 in an implementation, represented by scenario 300, which references elements of operational environment 102 of FIG. 1B, such as host 110, node 115, and node 120.

To begin, in scenario 300, node 115 receives namespace move request 107, which may include a request to move a namespace of node 115 to node 120. The namespace move request 107 may be provided to node 115 by host 110, or by another computing system, and may direct node 115 to move the namespace to node 120. The time it takes node 115 to move the namespace to node 120, or duration 310, may vary based on several factors, such as the size of the namespace (e.g., the number of logical block addresses associated with the namespace), the processing capacity of node 115, the processing capacity of node 120, and the like.

During the namespace move, host 110 may receive requests 105 that include I/O requests to perform I/O operations associated with the namespace subject to the namespace move and may provide the I/O requests to node 115. Node 115 may determine a status of the namespace, which may indicate that the namespace in the request is being transferred to node 120. Accordingly, node 115 may identify that the namespace in the requests corresponds to the namespace specified in the namespace move, and that the namespace is being moved at the given time that the request is received. If the namespace move has not finished based on the identified status of the namespace, node 115 may queue the request provided by host 110 for completion of the request by node 120 upon completion of the namespace move at queue 119 of node 115.

After duration 310, upon completion of the move and once namespace resides on node 120, node 115 provides the request, as well as any other requests received during the namespace move that correspond to the moving namespace, to node 120 for completion. Node 120 completes the request. For example, the request may include a read request specifying data to be read that is stored at one or more addresses of the namespace, or the request may include a write request specifying data to be written to one or more addresses of the namespace.

Based on completing the request, node 120 outputs a response based on the request. In some embodiments, based on completing the request, node 120 may provide a response back to node 115, and node 115 may provide the response to host 110. Based on receiving the response from node 115, host 110 can output responses 106, which may include an indication or an acknowledgement of completion of requests 105, information (e.g., data) based on requests 105, and the like based on requests 105.

In some embodiments, node 120 may instead, or in addition, provide the response directly to host 110. Further, based on the namespace move of the namespace from node 115 to node 120, host 110 may provide subsequent requests corresponding to the namespace to node 120 directly as opposed to providing such requests to node 115.

Figure 4:
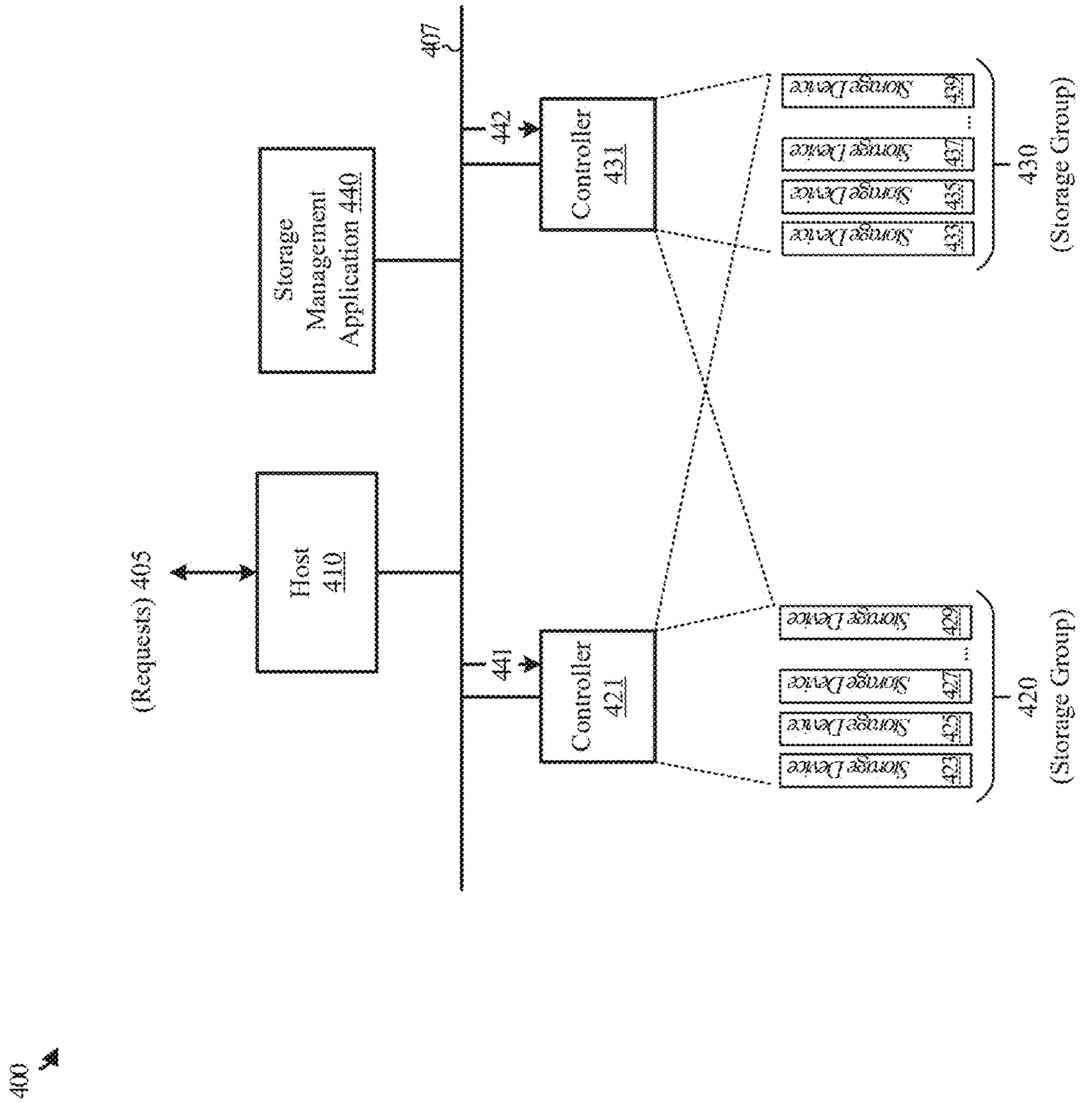
FIG. 4 illustrates an operating environment in an implementation.

FIG. 4 illustrates operating environment 400 for managing namespace moves in an implementation. Operating environment 400 includes network 407, host 410, storage group 420, controller 421, storage group 430, controller 431, and storage management application 440. Storage group 420 includes storage devices 423, 425, 427, and 429. Storage group 430 includes storage devices 433, 435, 437, and 429. In various embodiments, elements of operating environment 400 may be configured to operate namespace move management processes, such as process 500 of FIG. 5, as illustrated by scenario 600 of FIG. 6.

Host 410 may be representative of a host server, application, device, system, or the like, capable of providing services to user devices 405, 406, and 407 and capable of accessing storage group 420 and storage group 430, and storage thereof. Host 410 may include and may be implemented in hardware, software, and/or firmware, as well as combinations and variations thereof.

To provide such functionality, host 410 may be configured to run an application, such as a software program or program instructions executable by one or more computing devices. A client may access host 410 via a communication network (e.g., a personal computer, a tablet, a smartphone) to provide functionality of the application to end users in communication with host 410. Additionally, in some embodiments, host 410 may include a storage interface representative of an interface capable of providing access to storage group 420 and storage group 430 and storage devices thereof. For example, the storage interface may be configured to provide a logical and/or physical interface to storage groups 420 and 430 in accordance with a storage network protocol. For example, the storage interface may operate in accordance with a Non-Volatile Memory Express over Fabric (NVMe-oF) protocol. In some embodiments, the storage interface may operate in accordance with a different protocol, such as Network File System (NFS), Server Message Block protocol (SMB), Internet Small Computer System Interface (iSCSI), Fiber Channel (FC), Fiber Channel over Ethernet (FCoE), and the like.

Host 410 may communicate with other devices, servers, applications, and such via one or more protocols over network 407. Network 407 may be representative of a virtual network (e.g., VLAN) or a local area network (LAN) (e.g., network 112). Various other hosts, nodes, and devices may also be coupled to and communicate via network 407, such as storage management application 440, controller 421, and controller 431.

In an example embodiment, host 410 may be representative of a server running an application. A user device may interact with the application running on host 410 (e.g., via peripheral devices of the user device) and may provide requests 405 to host 410 via the application. For example, a user device may attempt to open a file (e.g., a read operation) stored in a storage device. By way of another example, the user device may attempt to save a file (e.g., a write operation) to a storage device of storage group 420 or storage group 430. Other requests from a variation of user devices may also be contemplated involving the access of memory and/or storage devices of a data storage system, such as one embodied in operating environment 400.

Storage groups 420 and 430 may be representative of sets of storage devices. In some embodiments, storage groups 420 and 430 may also include one or more controllers associated with the sets of storage devices with which to control and manage aspects of the respective storage devices. In the example embodiment illustrated in operating environment 400, storage group 420 includes storage devices 423, 425, 427, and 429 and storage group 430 includes storage devices 433, 435, 437, and 439.

Storage devices 423, 425, 427, 429, 433, 435, 437, and 439 may be representative of devices capable of storing information, such as hard-disk drives (HDDs) and/or solid state drives (SSDs), among other types of storage devices and memory devices. Each storage device may include a set of physical addresses at which information can be stored. Each set of physical addresses of the storage devices may be logically associated with a set of logical addresses or logical block partitions. In various examples, input/output (I/O) operations used to access data of the storage devices may specify start and end logical block addresses (LBAs) where data resides within a namespace.

Controllers 421 and 431 may be representative of computing devices capable of managing the namespaces, data thereof, and logical and physical addresses, as well as mappings thereof, of sets of storage devices including the storage devices of storage groups 420 and 430. Controllers 421 and 431 may each include one or more processing devices configured to execute program instructions to enable functionality provided by the program instructions. Examples of the processing devices may include one or more central processing units (CPUs), general purpose processors, Application Specific Integrated Circuits (ASICs), microcontroller units (MCUs), digital signal processors (DSPs), field-programmable gate arrays (FPGAs), and the like.

In some embodiments, controllers 421 and 431 may both be configured to perform data management operations and I/O operations associated with storage group 420 and storage group 430. In some embodiments, controllers 421 and 431 may be limited to performing such operations to storage devices of a single node. Other combinations or variations including other controllers and nodes may also be contemplated.

Storage management application 440 may be included to direct controllers 421 and 431 of storage groups 420 and 430, respectively, with respect to storage management. More particularly, storage management application 440 may direct controllers 421 and 431 to move namespaces from one location to another location (e.g., between nodes or controllers, between storage devices within one or more nodes, between blocks of addresses within one or more storage devices within one or more nodes) and may also indicate sets of addresses at which controllers 421 and 431 may store given information. Storage management application 440 may be representative of a software program or program instructions executable by one or more computing devices, such as a server, user device, or the like that includes one or more processing devices.

In operation, storage management application 440 provides namespace move request 441 to controller 421. Namespace move request 441 may indicate a namespace, or logical block addresses or data stored at a particular namespace, to be moved from one of storage devices 423, 425, 427, and 429 (e.g., source storage devices) to one or more of the storage devices of storage group 430 (e.g., destination storage devices). Based on receiving namespace move request 441, controller 421 may be configured to transfer the indicated namespace to the target storage device of storage group 430.

During the namespace move, host 410 may receive requests 405 to perform I/O operations associated with a namespace subject to the namespace move indicated in namespace move request 441. In response to receiving requests 405, host 410 communicates the I/O requests to controller 421 via the storage interface. Controller 421 may identify that the namespace indicated in the I/O request is being moved to storage group 430 based on namespace move request 441. As such, controller 421 may store the I/O operation in a queue at storage group 420 until completion of the namespace move for completion at storage group 430 after the namespace is moved to storage group 430.

In response to completion of namespace move request 441, storage group 420 may forward the queued I/O request (s) to controller 431. Controller 431 may perform the I/O request by accessing the namespace on one or more of storage devices 433, 435, 437, and 439. Upon performance of the I/O request, in some embodiments, controller 431 may provide a reply or response to controller 421. The response may indicate a completion (e.g., an acknowledgement) of a write request or may include data (based on a read request), for example. Controller 421 may then forward the response to host 410. Host 410 can provide the response to the user device that requested the information. In some embodiments, storage group 430 may instead, or in addition, provide the response directly to host 410.

In some embodiments, prior to, subsequent to, or concurrent to namespace move request 441, storage management application 440 may provide namespace move request 442 to controller 431 of storage group 430. Namespace move request 442 may indicate a different namespace relative to the namespace indicated in namespace move request 441 to be moved from storage group 430 to storage group 420, among other nodes. Accordingly, storage group 430 may function like storage group 420 as described above to queue any requests provided to storage group 430 during a namespace move of a namespace being moved from storage group 430 to storage group 420 and forward such requests to storage group 420 for completion thereby upon completion of the namespace move.

Figure 5:
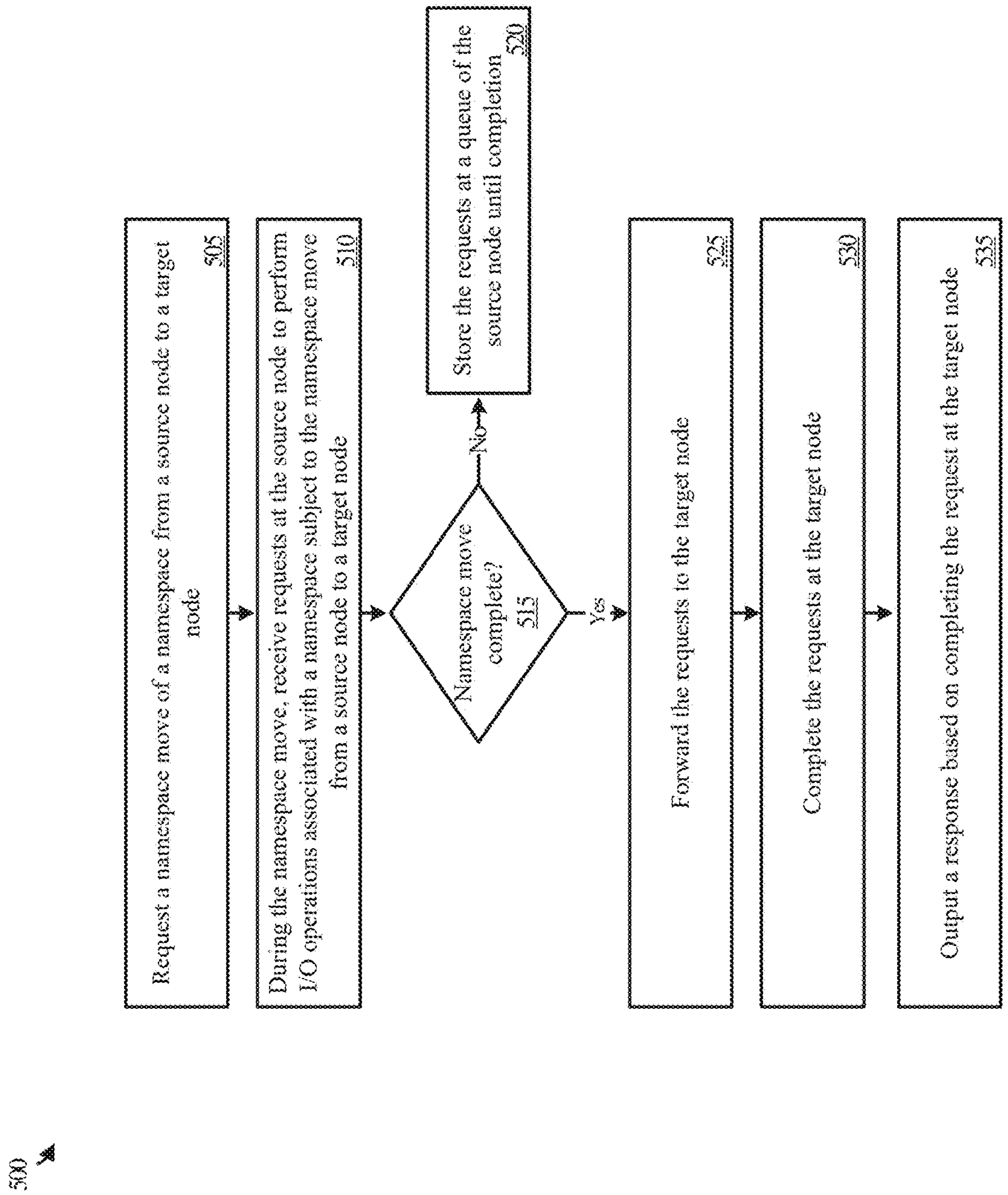
FIG. 5 illustrates a method for managing a namespace move between nodes of a data storage system in an implementation.

FIG. 5 illustrates a method for managing a namespace move between nodes of a data storage system in an implementation represented by process 500. Process 500 may be employed by a computing device, such as controller 421 or controller 431, an example of which is provided by computing system 701 of FIG. 7. Accordingly, process 500 may be implemented in hardware, software, and/or firmware, and may be implemented in program instructions executable by one or more processors of the computing device. The program instructions direct the computing device to operate in accordance with the steps of process 500, which reference elements of FIG. 4.

In step 505 of process 500, storage management application 440 provides namespace move request 441 to controller 421 of storage group 420 to request a move of a namespace from storage group 420 to storage group 430. Namespace move request 441 may indicate a namespace, or logical block addresses or data stored at a particular namespace, to be moved from one of storage devices 423, 425, 427, and 429 to one or more of storage devices 433, 435, 437, and 439 of storage group 430. Based on receiving namespace move request 441, controller 421 may be configured to transfer the indicated namespace to the target storage device of storage group 430.

During the namespace move, in step 510, storage group 420 receives an I/O request associated with a namespace from host 410. The request may indicate an action (e.g., read, write) and a namespace. Storage group 420 may identify that the namespace in the request corresponds to the namespace specified in the namespace move request 441 (i.e., the namespace is a namespace being moved).

In step 515, storage group 420 may determine whether the move of the namespace is complete. If the namespace move has not finished, in step 520, storage group 420 may store the I/O request provided by host 410 at a queue of storage group 420 for completion of the request by storage group 430 upon completion of the namespace move. If the namespace move has finished, and the namespace resides on one or more of the storage devices of storage group 430, in step 525, storage group 420 provides the request, as well as any other requests received during the namespace move that correspond to the moving namespace, to storage group 430 for completion.

In step 530, storage group 430 completes the request. For example, the request may include a read request specifying data to be read that is stored at one or more addresses of the namespace, or the request may include a write request specifying data to be written to one or more addresses of the namespace. As such, in step 535, storage group 430 outputs a response based on the request. In some embodiments, based on completing the request, storage group 430 may provide a response back to storage group 420, and storage group 420 may provide the response to host 110. In some embodiments, storage group 430 may provide the response directly to host 410. Based on receiving the response from storage group 420 or storage group 430, host 410 can output the response, which may include an indication of completion of the request from a particular user device (e.g., one of user device 405, 406, and 407), information (e.g., data) based on the request, and the like based on the request.

Figure 6:
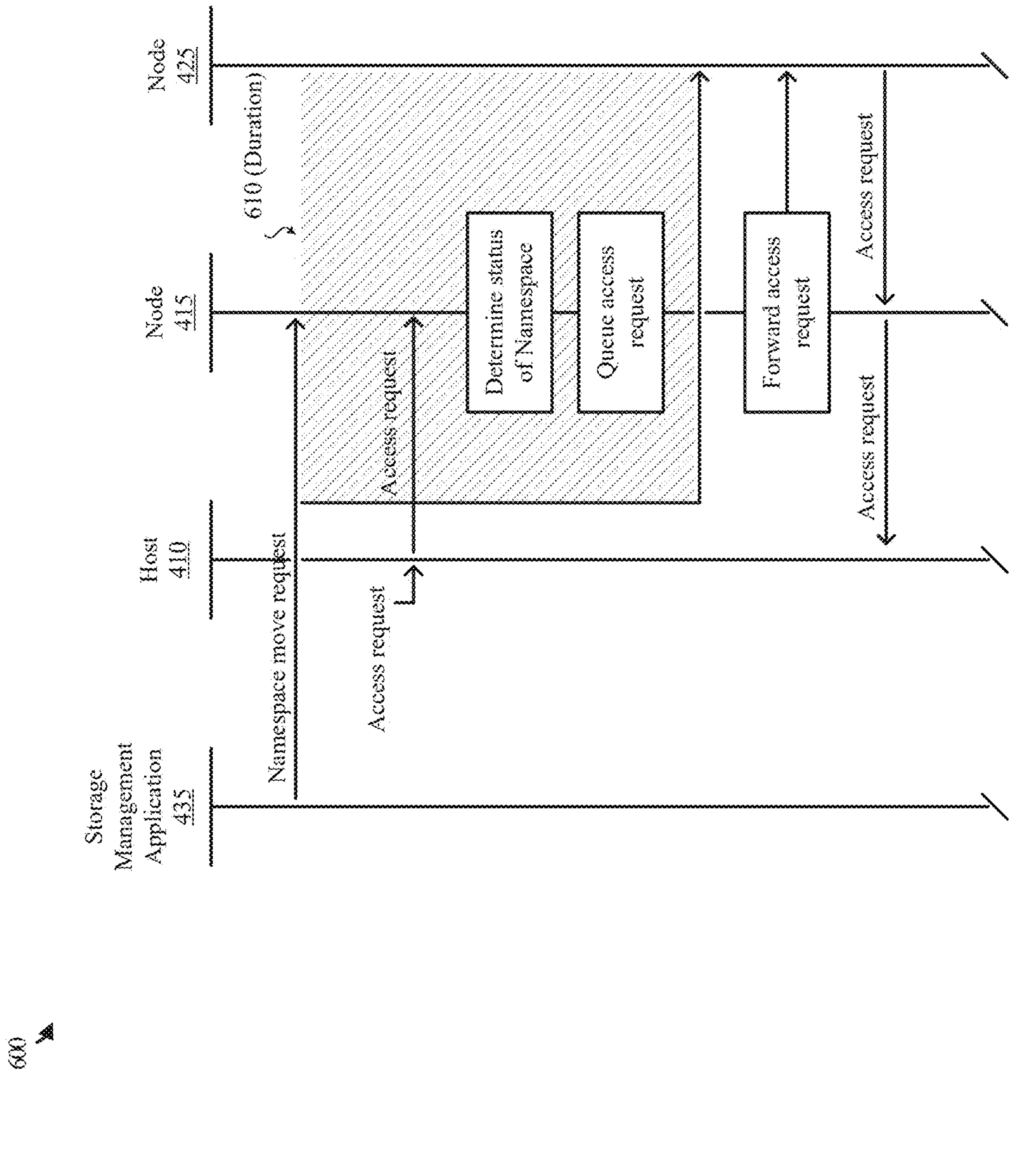
FIG. 6 illustrates an operational sequence related to a namespace move in an implementation.

FIG. 6 illustrates an operational scenario of an application of process 500 in the context of operational environment 400 in an implementation, represented by scenario 600, which references elements of operational environment 400 of FIG. 4, such as host 410, storage group 420, storage group 430, and storage management application 440.

To begin, in scenario 600, storage group 420 receives a request, namespace move request 441, including an indication to move a namespace of storage group 420 to storage group 430 from storage management application 440. Based on the request, storage management application 441 may direct storage group 420 to move the namespace to storage group 430. The time it takes storage group 420 to move the namespace to storage group 430, or duration 610, may vary based on several factors, such as the size of the namespace (e.g., the number of logical block addresses associated with the namespace), the processing capacity of storage group 420, the processing capacity of storage group 430, and the like.

During the namespace move, host 410 may receive requests 405 to perform I/O operations associated with a namespace subject to the namespace move and may provide the I/O operations to storage group 420. Storage group 420 may determine a status of the namespace, which may indicate that the namespace in the request is being transferred to storage group 430. Accordingly, storage group 420 may identify that the namespace in the request corresponds to the namespace specified in the namespace move, and that the namespace is being moved at the given time that the request is received. If the namespace move has not finished based on the identified status of the namespace, storage group 420 may store the request provided by host 410 at a queue of storage group 420 for completion of the request by storage group 430 upon completion of the namespace move.

After duration 610, upon completion of the move and once namespace resides on storage group 430, storage group 420 provides the request, as well as any other requests received during the namespace move that correspond to the moving namespace, to storage group 430 for completion. Storage group 430 completes the request. For example, the request may include a read request specifying data to be read that is stored at one or more addresses of the namespace, or the request may include a write request specifying data to be written to one or more addresses of the namespace.

Based on completing the request, storage group 430 outputs a response based on the request. In some embodiments, based on completing the request, storage group 430 may provide a response back to storage group 420, and storage group 420 may provide the response to host 410. Based on receiving the response from storage group 420, host 410 can output the response, which may include an indication of completion of the request from a particular user device, information (e.g., data) based on the request, and the like based on the request.

In some embodiments, storage group 430 may instead, or in addition, provide the response directly to host 410. Further, based on the namespace move of the namespace from storage group 420 to storage group 430, host 410 may provide subsequent requests corresponding to the namespace to storage group 430 directly as opposed to providing such requests to storage group 420.

It may be appreciated from the discussion above that developing strategies to mitigate the impact of data loss and disruption of requests to access data and corresponding storage devices due to storage device management processes has become important for enterprises and end users. Updates or upgrades to storage devices may occur frequently to maintain storage devices and keep storage devices up-to-date with the latest firmware and software to prevent events such as ransomware attacks, malware, data breaches, and data loss, which can severely disrupt operations and result in significant data loss. Despite frequent upgrades the storage devices, end users still need to access data to perform activities.

To mitigate the downtime and disruption introduced when performing storage device upgrades, enterprises may prevent access to the storage devices entirely. In other examples, enterprises may allow access to the storage devices, but if the data has been moved, the requesting device might not receive requested data due to the upgrade. Problematically, end users (clients, hosts) may receive error messages causing delay and disruption to activities in either case.

Accordingly, a system is proposed herein for managing access to storage devices, and logical storage partitions (also referred to as namespaces) thereof, when namespaces of the storage devices are undergoing a transfer from one storage device to another storage device. The system can identify namespaces of each storage device, determine when a namespace is being transferred, and a duration of the transfer, and determine the target location of the namespace in the destination storage device. In this way, in response to a request to access to a namespace undergoing a transfer, the system can queue the request for completion at the destination storage device. This may prevent the system from returning error messages and disrupting activities of the client and/or host, and instead, allowing non-disruptive access to storage devices, or nodes of storage devices.

Various embodiments of the present technology provide for a wide range of technical effects, advantages, and/or improvements to computing systems and components. For example, various embodiments may include one or more of the following technical effects, advantages, and/or improvements: 1) management of access to storage devices; 2) non-disruptive access to storage devices; and/or 3) non-disruptive management of requests corresponding to namespaces being moved from a storage device to one or more other storage devices.

In particular, the advantages of the technology disclosed herein include methods for managing namespace moves between storage devices and access thereto. For an organization, the proposed solution can provide flexibility in scheduling and performing data transfers, storage device upgrades, and the like without disrupting end user activities. Ultimately, the systems, methods, and devices disclosed herein can reduce errors and delays for end users when such transfers and upgrades occur as well as providing efficient storage management and access.

In an example embodiment, a method for managing namespace moves in a data storage system is provided. The method includes, during a namespace move associated with the data storage system, receiving requests at a first node in the data storage system to perform input/output (I/O) operations associated with a namespace subject to the namespace move and storing the requests in a queue at the first node until completion of the namespace move. The method also includes upon completion of the namespace move, forwarding the requests from the first node to a second node in the data storage system and performing the I/O operations at the second node. The namespace move includes a move of the namespace from the first node to the second node.

In another example embodiment, a system is provided that includes a first node of a data storage system, a second node of a data storage system, and a host coupled to the first and second nodes. The first node is configured to, during a namespace move associated with the data storage system, receive requests to perform I/O operations associated with a namespace subject to the namespace move and store the requests in a queue at the first node until completion of the namespace move. The first node is also configured to, upon completion of the namespace move, forward the requests to the second node for performance of the requests at the second node.

In yet another example embodiment, an apparatus is provided. The apparatus includes one or more computer-readable storage media, and program instructions stored on the one or more computer-readable storage media executable by a processing device that, based on being read and executed by the processing device, direct the processing device to perform various functions. For example, the program instructions may direct the processing device to, during a namespace move associated with a data storage system, receive requests at a first node in the data storage system to perform input/output (I/O) operations associated with a namespace subject to the namespace move and store the requests in a queue at the first node until completion of the namespace move. The program instructions may also direct the processing system to, upon completion of the namespace move, forward the requests from the first node to a second node in the data storage system and perform the I/O operations at the second node. The namespace move comprises a move of the namespace from the first node to the second node.

Figure 7:
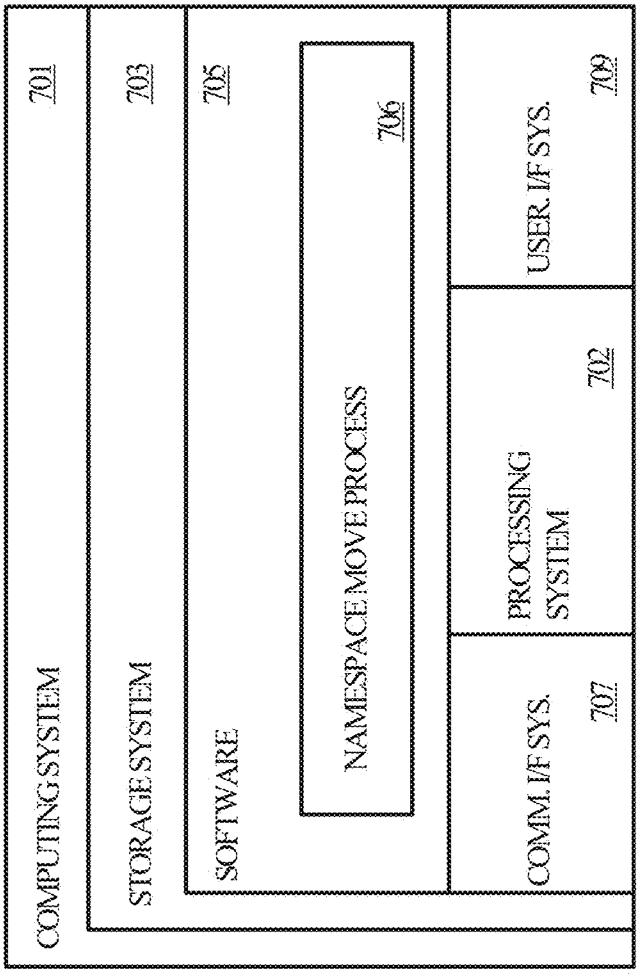
FIG. 7 illustrates a computing system suitable for implementing the various operational environments, architectures, environments, methods, processes, scenarios, sequences, and frameworks discussed below with respect to the other Figures.

FIG. 7 illustrates computing system 701, which is representative of any system or collection of systems in which the various applications, processes, services, and scenarios disclosed herein may be implemented. Examples of computing system 701 include, but are not limited to server computers, web servers, cloud computing platforms, and data center equipment, as well as any other type of physical or virtual server machine, container, and any variation or combination thereof.

Computing system 701 may be implemented as a single apparatus, system, or device or may be implemented in a distributed manner as multiple apparatuses, systems, or devices. Computing system 701 includes, but is not limited to, processing system 702, storage system 703, software 705, communication interface system 707, and user interface system 709. Processing system 702 is operatively coupled with storage system 703, communication interface system 707, and user interface system 709.

Processing system 702 loads and executes software 705 from storage system 703. Software 705 includes and implements namespace move process 706, which is representative of the processes discussed with respect to the preceding Figures, such as processes 200 and 500, as well as operational scenarios and sequences, such as scenarios 300 and 600. When executed by processing system 702, software 705 directs processing system 702 to operate as described herein for at least the various processes, operational scenarios, and sequences discussed in the foregoing implementations. Computing system 701 may optionally include additional devices, features, or functionality not discussed for purposes of brevity.

Referring still to FIG. 7, processing system 702 may include a microprocessor and other circuitry that retrieves and executes software 705 from storage system 703. Processing system 702 may be implemented within a single processing device but may also be distributed across multiple processing devices or sub-systems that cooperate in executing program instructions. Examples of processing system 702 include general purpose central processing units, microcontroller units, graphical processing units, application specific processors, integrated circuits, application specific integrated circuits, and logic devices, as well as any other type of processing device, combinations, or variations thereof.

Storage system 703 may comprise any computer readable storage media readable by processing system 702 and capable of storing software 705. Storage system 703 may include volatile and nonvolatile, removable, and non-removable media implemented in any method or technology for storage of information, such as computer readable instructions, data structures, program modules, or other data. Examples of storage media include random access memory, read only memory, magnetic disks, optical disks, flash memory, virtual memory and non-virtual memory, magnetic cassettes, magnetic tape, magnetic disk storage or other magnetic storage devices, or any other suitable storage media. In no case is the computer readable storage media a propagated signal. Storage system 703 may be implemented as a single storage device but may also be implemented across multiple storage devices or sub-systems co-located or distributed relative to each other. Storage system 703 may comprise additional elements, such as a controller capable of communicating with processing system 702 or possibly other systems.

Software 705 (including namespace move process 706) may be implemented in program instructions and among other functions may, when executed by processing system 702, direct processing system 702 to operate as described with respect to the various operational scenarios, sequences, and processes illustrated herein. For example, software 705 may include program instructions for implementing namespace move, access, and management processes and procedures as described herein.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number, respectively. The word "or," in reference to a list of two or more items, covers all of the following interpretations of the word: any of the items in the list, all of the items in the list, and any combination of the items in the list.

The phrases "in some embodiments," "according to some embodiments," "in the embodiments shown," "in other embodiments," "in an implementation," "in some implementations," and the like generally mean the particular feature, structure, or characteristic following the phrase is included in at least one implementation of the present technology, and may be included in more than one implementation. In addition, such phrases do not necessarily refer to the same embodiments or different embodiments.

The above Detailed Description of examples of the technology is not intended to be exhaustive or to limit the technology to the precise form disclosed above. While specific examples for the technology are described above for illustrative purposes, various equivalent modifications are possible within the scope of the technology, as those skilled in the relevant art will recognize. For example, while processes or blocks are presented in a given order, alternative implementations may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed or implemented in parallel or may be performed at different times. Further any specific numbers noted herein are only examples: alternative implementations may employ differing values or ranges.

The teachings of the technology provided herein can be applied to other systems, not necessarily the system described above. The elements and acts of the various examples described above can be combined to provide further implementations of the technology. Some alternative implementations of the technology may include not only additional elements to those implementations noted above, but also may include fewer elements.

These and other changes can be made to the technology in light of the above Detailed Description. While the above description describes certain examples of the technology, and describes the best mode contemplated, no matter how detailed the above appears in text, the technology can be practiced in many ways. Details of the system may vary considerably in its specific implementation, while still being encompassed by the technology disclosed herein. As noted above, particular terminology used when describing certain features or aspects of the technology should not be taken to imply that the terminology is being redefined herein to be restricted to any specific characteristics, features, or aspects of the technology with which that terminology is associated. In general, the terms used in the following claims should not be construed to limit the technology to the specific examples disclosed in the specification, unless the above Detailed Description section explicitly defines such terms. Accordingly, the actual scope of the technology encompasses not only the disclosed examples, but also all equivalent ways of practicing or implementing the technology under the claims.

To reduce the number of claims, certain aspects of the technology are presented below in certain claim forms, but the applicant contemplates the various aspects of the technology in any number of claim forms. For example, while only one aspect of the technology is recited as a computer-readable medium claim, other aspects may likewise be embodied as a computer-readable medium claim, or in other forms, such as being embodied in a means-plus-function claim. Any claims intended to be treated under 35 U.S.C. §112(f) will begin with the words "means for", but use of the term "for" in any other context is not intended to invoke treatment under 35 U.S.C. §112(f). Accordingly, the applicant reserves the right to pursue additional claims after filing this application to pursue such additional claim forms, in either this application or in a continuing application.

What is claimed is:

1. A method for managing namespace moves in a data storage system, the method comprising:
- during a namespace move associated with the data storage system:
  - receiving requests at a first node in the data storage system to perform input/output (I/O) operations associated with a namespace subject to the namespace move; and
  - storing the requests in a queue at the first node until completion of the namespace move;
  - wherein, during the namespace move, the first node defers return of protocol-level error responses for the requests associated with the namespace subject to the namespace move until the namespace move is complete; and
- upon completion of the namespace move:
  - forwarding the requests from the first node to a second node in the data storage system; and
  - performing the I/O operations at the second node;
- wherein the namespace move comprises a move of the namespace from the first node to the second node.

2. The method of claim 1, further comprising, during the namespace move:
- receiving other requests at the first node to perform other I/O operations associated with one or more other namespaces not subject to the namespace move; and
- performing the other I/O operations at the first node.

3. The method of claim 2, further comprising, upon completion of the I/O operations, the second node replying to a source of each of the requests with an acknowledgement indicative of having completed a corresponding one of the I/O operations.

4. The method of claim 2, further comprising, upon completion of the I/O operations, the second node replying to the first node with respect to each of the requests with an acknowledgement indicative of having completed a corresponding one of the I/O operations.

5. The method of claim 4, further comprising the first node replying to a source of each of the requests with the acknowledgement indicative of having completed the corresponding one of the I/O operations.

6. The method of claim 1, wherein:
- the first node comprises a first set of storage devices;
- the second node comprises a second set of storage devices;
- the namespace comprises an association between a virtual volume and the first set of storage devices; and
- wherein the namespace move comprises a change in the association between the virtual volume and the first set of storage devices to an association between the virtual volume and the second set of storage devices.

7. The method of claim 1, wherein the requests stored in the queue are maintained during the namespace move without reissuance by a host, and wherein the I/O operations are performed after completion of the namespace move using parameters associated with the queued requests.

8. The method of claim 1, wherein the I/O operations comprise read and write operations with respect to data stored on at least the first set of storage devices.

9. A system, comprising:
- a first node of a data storage system;
- a second node of a data storage system; and
- a host coupled to the first node and to the second node;
- wherein the first node is configured to:
  - during a namespace move associated with the data storage system:
    - receive requests to perform input/output (I/O) operations associated with a namespace subject to the namespace move; and
    - store the requests in queue until completion of the namespace move;
    - wherein, during the namespace move, the first node defers return of protocol-level error responses for the requests associated with the namespace subject to the namespace move until the namespace move is complete; and
  - upon completion of the namespace move:
    - forward the requests from the queue to the second node for performance of the requests at the second node; and
- wherein the namespace move comprises a move of the namespace from the first node to the second node.

10. The system of claim 9, wherein the first node is further configured to, during the namespace move:

receive other requests to perform other I/O operations associated with one or more other namespaces not subject to the namespace move; and perform the other I/O operations.

11. The system of claim 10, wherein the second node is configured to, upon completion of the I/O operations, reply to a source of each of the requests with an acknowledgement indicative of having completed a corresponding one of the I/O operations.

12. The system of claim 10, wherein the second node is configured to, upon completion of the I/O operations, reply to the first node with respect to each of the requests with an acknowledgement indicative of having completed a corresponding one of the I/O operations.

13. The system of claim 12, wherein the first node is further configured to reply to a source of each of the requests with the acknowledgement indicative of having completed the corresponding one of the I/O operations.

14. The system of claim 9, wherein:

the first node comprises a first set of storage devices;

the second node comprises a second set of storage devices;

the namespace comprises an association between a virtual volume and the first set of storage devices; and wherein the namespace move comprises a change in the association between the virtual volume and the first set of storage devices to an association between the virtual volume and the second set of storage devices.

15. The system of claim 9, wherein the I/O operations comprise read and write operations with respect to data stored on at least the first set of storage devices.

16. An apparatus, comprising:

one or more computer-readable storage media; and program instructions stored on the one or more computer-readable storage media executable by a processing device that, based on being read and executed by the processing device, direct the processing device to:

during a namespace move associated with a data storage system:

receive requests at a first node in the data storage system to perform input/output (I/O) operations associated with a namespace subject to the namespace move; and store the requests in a queue at the first node until completion of the namespace move;

wherein, during the namespace move, the first node defers return of protocol-level error responses for the requests associated with the namespace subject to the namespace move until the namespace move is complete; and upon completion of the namespace move:

forward the requests from the first node to a second node in the data storage system; and perform the I/O operations at the second node;

wherein the namespace move comprises a move of the namespace from the first node to the second node.

17. The apparatus of claim 16, wherein the program instructions further direct the processing device to, during the namespace move:

receive other requests at the first node to perform other I/O operations associated with one or more other namespaces not subject to the namespace move; and perform the other I/O operations at the first node.

18. The apparatus of claim 16, wherein the program instructions further direct the processing device to, upon completion of the I/O operations, reply, via the second node, to the first node with respect to each of the requests with an acknowledgement indicative of having completed a corresponding one of the I/O operations.

19. The apparatus of claim 18, wherein the program instructions further direct the processing system to, reply, via the first node, to a source of each of the requests with the acknowledgement indicative of having completed the corresponding one of the I/O operations.

20. The apparatus of claim 16, wherein:

the first node comprises a first set of storage devices;

the second node comprises a second set of storage devices;

the namespace comprises an association between a virtual volume and the first set of storage devices; and wherein the namespace move comprises a change in the association between the virtual volume and the first set of storage devices to an association between the virtual volume and the second set of storage devices.

* * * * *